United States Patent
Kim et al.

(10) Patent No.: US 12,441,676 B2
(45) Date of Patent: Oct. 14, 2025

(54) PROCESS FOR PREPARING ACRYLIC ACID

(71) Applicant: LG CHEM, LTD., Seoul (KR)

(72) Inventors: Hyebin Kim, Daejeon (KR); Mi Kyung Kim, Daejeon (KR); Eunkyo Kim, Daejeon (KR); Joon Ho Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 564 days.

(21) Appl. No.: 17/923,885

(22) PCT Filed: Oct. 27, 2021

(86) PCT No.: PCT/KR2021/015168
§ 371 (c)(1),
(2) Date: Nov. 7, 2022

(87) PCT Pub. No.: WO2022/119125
PCT Pub. Date: Jun. 9, 2022

(65) Prior Publication Data
US 2023/0271914 A1    Aug. 31, 2023

(30) Foreign Application Priority Data
Dec. 3, 2020 (KR) .................. 10-2020-0167623

(51) Int. Cl.
*C07C 57/04* (2006.01)

(52) U.S. Cl.
CPC .................... *C07C 57/04* (2013.01)

(58) Field of Classification Search
CPC ....... C07C 45/783; C07C 47/06; C07C 51/44; C07C 57/04
See application file for complete search history.

(56) References Cited

U.S. PATENT DOCUMENTS

| | | | |
|---|---|---|---|
| 4,615,769 A | 10/1986 | Horigome et al. | |
| 6,399,817 B1 | 6/2002 | Chapman et al. | |
| 7,183,428 B2 | 2/2007 | Ueno et al. | |
| 7,799,946 B2 * | 9/2010 | Galloway | C07C 51/48 562/545 |
| 8,246,790 B2 | 8/2012 | Baek et al. | |
| 9,662,646 B2 | 5/2017 | You et al. | |
| 9,776,941 B2 | 10/2017 | Shimizu et al. | |
| 10,308,582 B2 | 6/2019 | Binder et al. | |
| 2010/0113822 A1 | 5/2010 | Craciun et al. | |
| 2012/0178965 A1 | 7/2012 | Fauconet | |
| 2013/0273384 A1 | 10/2013 | Godlewski et al. | |
| 2018/0079706 A1 | 3/2018 | Jain et al. | |

FOREIGN PATENT DOCUMENTS

| | | | |
|---|---|---|---|
| CN | 1114303 A | | 1/1996 |
| CN | 1269349 A | | 10/2000 |
| CN | 101255109 | * | 9/2008 |
| CN | 101255109 B | | 1/2011 |
| CN | 107428659 A | | 12/2017 |
| EP | 0685448 A1 | | 12/1995 |
| EP | 2456743 B1 | | 5/2015 |
| FR | 2212315 A1 | | 7/1974 |
| JP | 2014-189510 A | | 10/2014 |
| JP | 2015-518481 A | | 7/2015 |
| JP | 6574838 B2 | | 9/2019 |
| KR | 10-1990-0008691 B1 | | 11/1990 |
| KR | 10-2004-0108610 A | | 12/2004 |
| KR | 10-2009-0041355 A | | 4/2009 |
| KR | 10-2015-0096745 A | | 8/2015 |
| KR | 10-2016-0018699 A | | 2/2016 |
| WO | 2005-095320 A1 | | 10/2005 |

OTHER PUBLICATIONS

CN101255109 translation (Year: 2008).*
Office Action of Chinese Patent Office in Appl'n No. 202180029257. 8, dated Jul. 14, 2023.
International Search Report from PCT/KR2021/015168, dated Feb. 18, 2022.
Written Opinion of the ISA from PCT/KR2021/015168, dated Feb. 18, 2022.

* cited by examiner

*Primary Examiner* — Andrew D Kosar
*Assistant Examiner* — Blaine G Doletski
(74) *Attorney, Agent, or Firm* — Bryan Cave Leighton Paisner LLP

(57) ABSTRACT

The present application relates to a process for producing acrylic acid.

14 Claims, 2 Drawing Sheets

【FIG. 1】
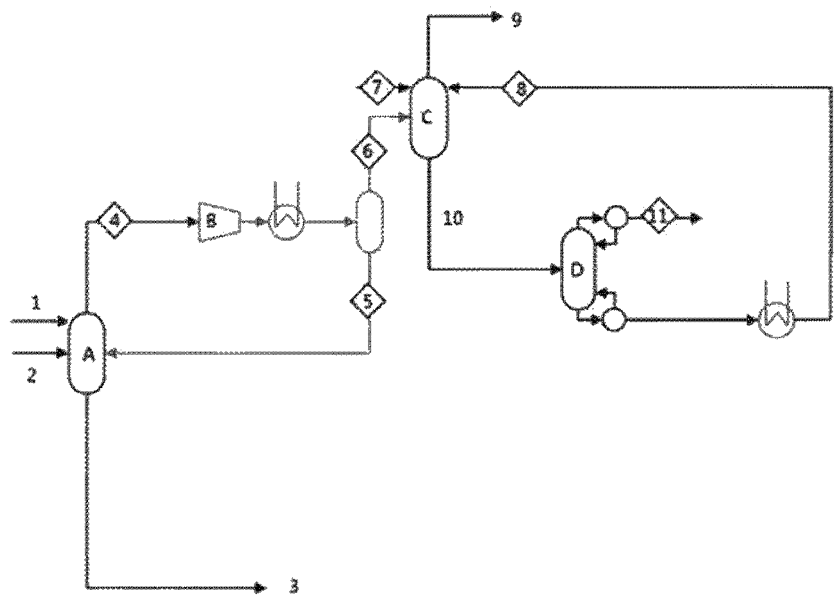
【FIG. 2】
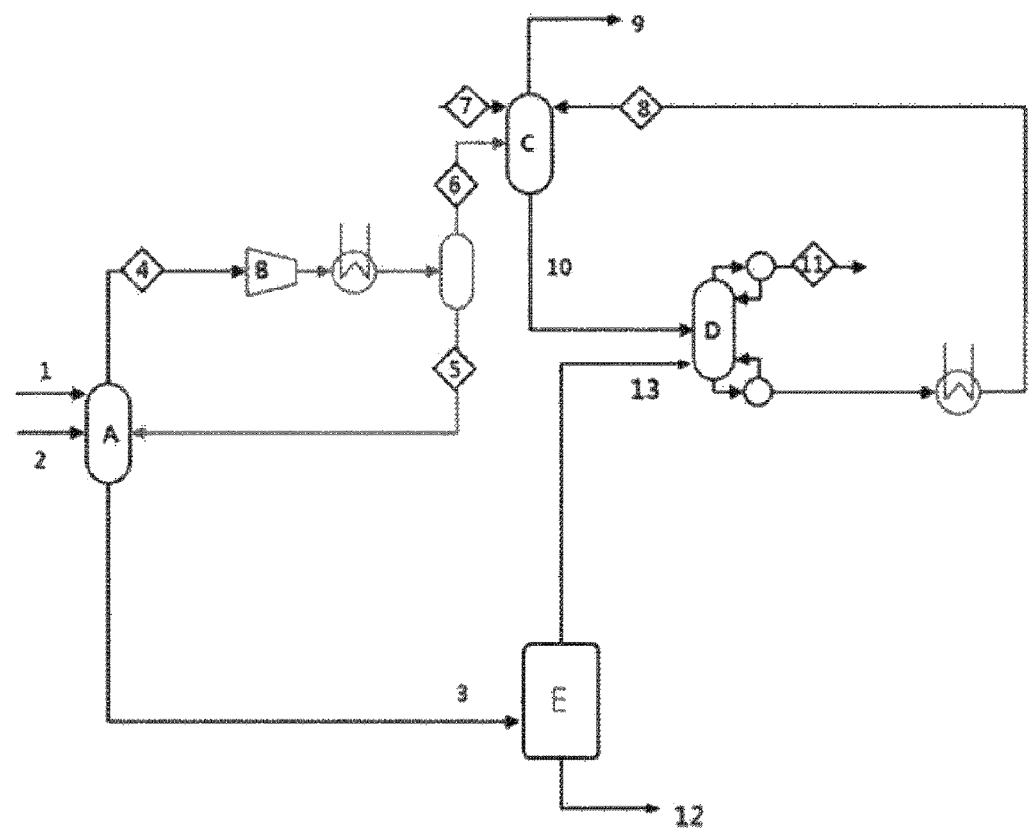

【FIG. 3】
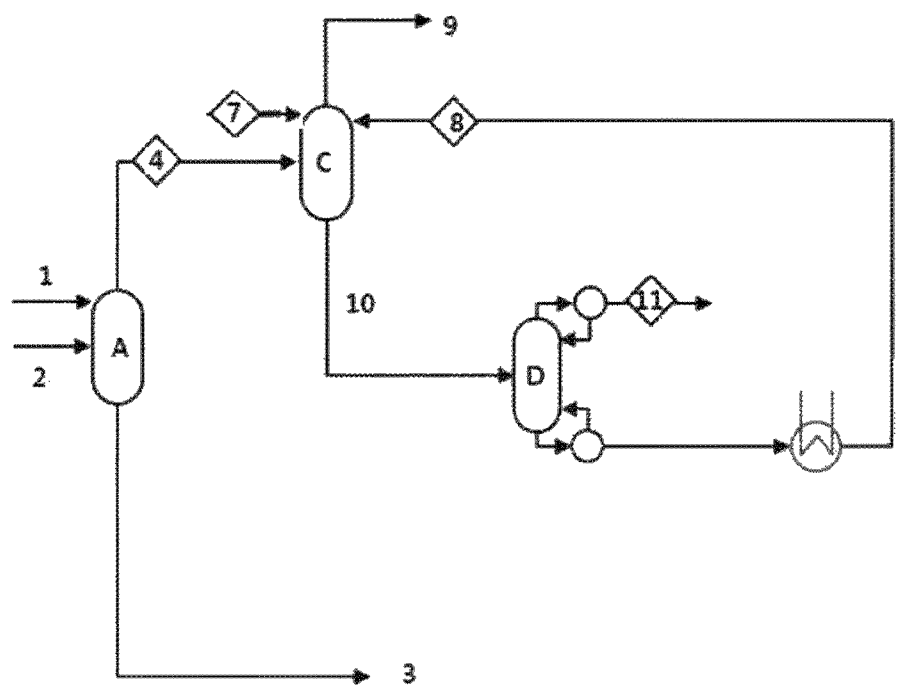

PROCESS FOR PREPARING ACRYLIC ACID

CROSS-REFERENCE TO RELATED APPLICATIONS

This application is a National Phase entry pursuant to 35 U.S.C. § 371 of International Application No. PCT/KR2021/015168, filed on Oct. 27, 2021, and claims priority to and the benefits of Korean Patent Application No. 10-2020-0167623, filed on Dec. 3, 2020, the entire contents of which are incorporated by reference in their entirety for all purposes as if fully set forth herein.

TECHNICAL FIELD

The present application relates to a process for producing acrylic acid.

BACKGROUND ART

Acrylic acid has been generally produced through an oxidative dehydrogenation reaction of propylene, and demands on acrylic acid have increased as a raw material of super absorbent polymers, paints, adhesives and the like. Particularly, super absorbent polymers are used as hygiene products such as diapers.

So far, a considerable number of chemical products have been produced using raw materials derived from fossil raw materials such as coal or petroleum. However, using recyclable bio-derived resources as a carbon source has recently received attention as a substitute for existing fossil raw materials in terms of preventing global warming and protecting the environment. For example, development of methods using biomass resources including starch-based biomass such as corn or wheat, carbohydrate-based biomass such as sugar cane, cellulose-based biomass such as residue of rapeseed or rice straw, and the like as a raw material has been attempted.

In order words, studies on breaking from existing petrochemical-based manufacturing processes and producing chemical products based on environmental-friendly raw materials to obtain excellent properties in terms of environmental protection while obtaining sustainability are recently in progress.

One type of reactions producing other chemical products from lactic acid may include a gas-phase reaction in which a raw material including lactic acid is evaporated and brought into contact with a catalyst in a gaseous state to obtain a product. For example, as a technology of producing acrylic acid using lactic acid, a gas-phase dehydration reaction using a solid catalyst is known, and the dehydration reaction of lactic acid is mainly studied as a gas-phase reaction.

Lactic acid is a substance that polymerizes as an esterification reaction occurs in a liquid phase without a catalyst in the absence of water, and reacts as a lactic acid oligomer as lactic acid is concentrated and a concentration thereof increases. Dehydration occurs as lactic acid is oligomerized, and an oligomerization reaction of lactic acid occurs as the lactic acid is concentrated without water. When the lactic acid oligomer is introduced to a reactor for producing acrylic acid, fouling occurs in the reactor and the reaction yield decreases, and therefore, studies on a method to decrease the content of lactic acid oligomer for producing acrylic acid is in progress.

In addition to such a problem, economic feasibility needs to be enhanced in developing the process since reactions of bio-raw materials show low acrylic acid selectivity compared to existing petrochemical reactions such as an oxidation reaction of propylene.

Particularly, when producing bio-raw material-based acrylic acid, by-products such as carbon monoxide, carbon dioxide and acetaldehyde, which are by-products having a low boiling point, are produced together with acrylic acid production lowering acrylic acid selectivity, and accordingly, studies on a process to smoothly separate by-products such as low boiling point by-products and acrylic acid and increase purity of the low boiling point by-products themselves for commercialization when producing bio-raw material-based acrylic acid are in progress.

PRIOR ART DOCUMENTS

Patent Documents (Patent Document 1) International Patent Application Laid-Open Publication No. 2005-095320

DISCLOSURE

Technical Problem

The present application is directed to providing a process for producing acrylic acid.

Technical Solution

One embodiment of the present application provides a process for producing acrylic acid, the process including (1) separating a first low-boiling-point material including acetaldehyde (ACHO) and a first high-boiling-point material including acrylic acid (AA) by cooling a reaction product of a bio-raw material; (2) separating a condensed second low-boiling-point material including acetaldehyde (ACHO) and a second high-boiling-point material including acrylic acid (AA) by compressing the first low-boiling-point material including acetaldehyde (ACHO); (3) separating a first incompressible material and a third low-boiling-point material including acetaldehyde (ACHO) by adding a second absorbent to the condensed second low-boiling-point material including acetaldehyde (ACHO) and cooling thereof; and (4) purifying the first high-boiling-point material including acrylic acid (AA) to obtain acrylic acid.

Advantageous Effects

A process for producing acrylic acid according to one embodiment of the present application includes a step 1 of separating a first low-boiling-point material including acetaldehyde (ACHO) and a first high-boiling-point material including acrylic acid (AA) by adding (or not adding) a first absorbent to a reaction product of a bio-raw material and cooling the result and a step 2 of compressing and condensing the first low-boiling-point material including acetaldehyde (ACHO) gone through the step 1 by including the first low-boiling-point material including acetaldehyde (ACHO) in a compressor, and accordingly, a pressure of an absorption process (step 3) used to separate acetaldehyde may be increased during the operation, and since increasing the pressure is advantageous for condensing the aldehyde, the amount of a second absorbent used can be effectively reduced, and as a result, a cooling calorie of the absorbent is reduced and an amount of a refrigerant used can be reduced.

In addition, during the compression process of the step 2, the condensed second high-boiling-point material can be recovered back to the step 1 to reduce loss of acrylic acid, and accordingly, an amount of the first absorbent used in the step 1 can be effectively reduced (including a case of not using the first absorbent).

In other words, the process for producing acrylic acid according to the present application is capable of commercializing acetaldehyde, which is produced as a by-product, as a high purity and high yield product, and economic feasibility of the bioprocess is enhanced since both acrylic acid and acetaldehyde can be obtained.

BRIEF DESCRIPTION OF DRAWINGS

FIG. 1 is a schematic diagram illustrating a process for producing acrylic acid according to one embodiment of the present application.

FIG. 2 is a schematic diagram illustrating a process for producing acrylic acid according to one embodiment of the present application.

FIG. 3 is a schematic diagram illustrating processes for producing acrylic acid according to Comparative Example 1 and Comparative Example 2 of the present application.

REFERENCE NUMERAL

A: Cooling Tower
B: Compressor
C: Absorption Tower
D: Separation Tower
E: Distillation Tower
1: First Absorbent
2: Reaction Product of Bio-Raw Material
3: First High-Boiling-Point Material
4: First Low-Boiling-Point Material
5: Second High-Boiling-Point Material
6: Second Low-Boiling-Point Material
7: Second Absorbent
8: Second Absorbent (Circulation Flow)
9: First Incompressible Material
10: Third Low-Boiling-Point Material
11: Acetaldehyde
12: Second-1 High-Boiling-Point Material
13: Second-2 Low-Boiling-Point Material

DETAILED DESCRIPTION

Hereinafter, the present specification will be described in more detail.

In the present specification, a description of a certain part "including" certain constituents means capable of further including other constituents, and does not exclude other constituents unless particularly stated on the contrary.

In the present specification, 'p to q' means a range of 'greater than or equal to p and less than or equal to q'.

Hereinafter, embodiments of the present disclosure will be described in detail with reference to accompanying drawings so that those having common knowledge in the art may readily implement the present disclosure. However, the present disclosure may be embodied in various different forms, and is not limited to the embodiments described herein.

One embodiment of the present application provides a process for producing acrylic acid, the process including a step 1 of separating a first low-boiling-point material including acetaldehyde (ACHO) and a first high-boiling-point material including acrylic acid (AA) by cooling a reaction product of a bio-raw material; a step 2 of separating a condensed second low-boiling-point material including acetaldehyde (ACHO) and a second high-boiling-point material including acrylic acid (AA) by compressing the first low-boiling-point material including acetaldehyde (ACHO); a step 3 of separating a first incompressible material and a third low-boiling-point material including acetaldehyde (ACHO) by adding a second absorbent to the second low-boiling-point material including acetaldehyde (ACHO) and cooling the result; and a step 4 of producing acrylic acid by purifying the first high-boiling-point material including acrylic acid (AA).

The process for producing acrylic acid according to one embodiment of the present application includes the step 1 of separating a first low-boiling-point material including acetaldehyde (ACHO) and a first high-boiling-point material including acrylic acid (AA) by adding (or not adding) a first absorbent to a reaction product of a bio-raw material and cooling the result and the step 2 of compressing and condensing the first low-boiling-point material including acetaldehyde (ACHO) gone through the step 1 by including the first low-boiling-point material including acetaldehyde (ACHO) in a compressor, and accordingly, a pressure of the absorption process (step 3) used to separate acetaldehyde may be increased during the operation, and since increasing the pressure is advantageous for condensing the aldehyde, the amount of a second absorbent used may be effectively reduced, and as a result, a cooling calorie of the absorbent is reduced and an amount of a refrigerant used may be reduced.

In addition, during the compression process of the step 2, the condensed second high-boiling-point material may be recovered back to the step 1 to reduce loss of acrylic acid, and accordingly, an amount of the first absorbent used in the step 1 may be effectively reduced (including a case of not using the first absorbent).

In other words, the process for producing acrylic acid according to the present application is capable of commercializing acetaldehyde, which is produced as a by-product, as a high purity and high yield product, and economic feasibility of the bioprocess is enhanced since both acrylic acid and acetaldehyde can be obtained.

Particularly, acetaldehyde is produced as a by-product in the reaction product of the bio-raw material since a dehydration reaction of lactic acid occurs at a high temperature (330° C. to 400° C.), and by the process for producing acrylic acid according to the disclosure of the present application including the step 3 in the process, acetaldehyde produced as a by-product may be commercialized as a high purity and high yield product while producing high purity and high yield acrylic acid as above, which enhances economic feasibility of the bioprocess since both acrylic acid and acetaldehyde may be obtained.

In other words, the present disclosure includes a process of producing bio-raw material-based acrylic acid instead of an existing petrochemical process of producing acrylic acid using an oxidation reaction of propylene, and the process for producing acrylic acid according to the present application is capable of obtaining high purity acrylic acid by including both the step 1 and the step 2, and, by adding the compression process of the step 2, may reduce the amount of a refrigerant when conducting the process, and is capable of obtaining high purity acetaldehyde as well by further including the step 3, and accordingly, it is a main characteristic of the disclosure of the present application to enhance economic feasibility of the bioprocess by commercializing a material discarded as a by-product as well.

One embodiment of the present application provides the step 1 of separating a first low-boiling-point material including acetaldehyde (ACHO) and a first high-boiling-point material including acrylic acid (AA) by cooling a reaction product of a bio-raw material.

The reaction of the bio-raw material included in the step 1 may include a dehydration reaction of lactic acid, and may include any reaction without limit as long as it is a reaction of a bio-raw material for producing acrylic acid.

In one embodiment of the present application, the bio-raw material may be lactic acid in a gas phase.

In one embodiment of the present application, the gas phase may mean a vaporized state, that is, a state in which a liquid is vaporized to become a gas.

In the present application, the lactic acid is an organic compound having an asymmetric carbon atom to which four atomic groups of a carboxyl group, a hydroxyl group, a methyl group and hydrogen bond, includes both D-lactic acid and L-lactic acid, and may mean a single lactic acid monomer.

In the present application, a lactic acid oligomer means a material obtained by lactic acid reacting to each other to form a dimer, a trimer and the like, and the lactic acid oligomer may mean a dimer to a 100-mer of lactic acid.

Lactic acid is a substance that polymerizes through an esterification reaction in a liquid phase without a catalyst even in the absence of water, and substances formed through a polymerization reaction of lactic acid may all be expressed as a lactic acid oligomer. In other words, all substances formed through a polymerization reaction of lactic acid other than a single lactic acid monomer may be defined as a lactic acid oligomer.

In the process for producing acrylic acid provided in one embodiment of the present application, the vapor phase lactic acid includes water; and a lactic acid raw material, and the lactic acid raw material includes lactic acid; and a lactic acid oligomer, and the lactic acid raw material is included in greater than or equal to 10 parts by weight and less than or equal to 100 parts by weight based on 100 parts by weight of the vapor phase lactic acid.

In another embodiment, the lactic acid raw material may be included in greater than or equal to 10 parts by weight and less than or equal to 100 parts by weight, preferably greater than or equal to 30 parts by weight and less than or equal to 100 parts by weight, and more preferably greater than or equal to 60 parts by weight and less than or equal to 100 parts by weight based on parts by weight of the vapor phase lactic acid.

The vapor phase lactic acid is an aqueous lactic acid solution in a final vaporized state before producing acrylic acid, and by the lactic acid raw material content satisfying the above-mentioned range in the vapor phase lactic acid, the introduced amount of the lactic acid raw material itself is suitable, and the water content is adjusted to a proper range, and as a result, excellent economic feasibility is obtained in the process for producing acrylic acid according to the present application.

In the process for producing acrylic acid provided in one embodiment of the present application, a ratio of the lactic acid:lactic acid oligomer in the vapor phase lactic acid may be from 100:0 to 80:20.

In another embodiment, a ratio of the lactic acid:lactic acid oligomer in the vapor phase lactic acid may satisfy a range of 100:0 to 80:20, preferably 100:0 to 90:10 and more preferably 100:0 to 95:5.

In other words, the process for producing acrylic acid according to the present disclosure breaks from existing petrochemical-based manufacturing processes and produces acrylic acid based on lactic acid, an environmental-friendly bio-raw material, and as a result, excellent properties are obtained in terms of environmental protection while obtaining sustainability. The vapor phase lactic acid corresponds to the bio-raw material of the step 1 according to the present application, and fouling occurring in the reactor may be reduced for the process for producing final acrylic acid and the reaction yield may increase.

In one embodiment of the present application, the reaction product of the bio-raw material may include acrylic acid, acetaldehyde, carbon monoxide, carbon dioxide, water, hydrogen, a lactic acid monomer, acetic acid, 2,3-pentadione (2,3-PD) and propionic acid (PA).

Particularly, acetaldehyde is not produced in a petrochemical-based propylene oxidation reaction since the reaction temperature is from 250° C. to 270° C., however, acetaldehyde is produced as a by-product in the process for producing acrylic acid since a dehydration reaction of the vapor phase lactic acid in the reaction of the bio-raw material according to the present application occurs at a high temperature (330° C. to 400° C.), and commercializing acetaldehyde as well produced as a by-product herein is a main purpose of the present disclosure.

In the process for producing acrylic acid provided in one embodiment of the present application, the step 1 includes a step of separating through a cooling tower, and the cooling tower has a cooling temperature of higher than or equal to 10° C. and lower than or equal to 150° C. and an inner pressure of greater than or equal to 0.5 bar and less than or equal to 5.0 bar.

In another embodiment, the cooling tower may have an inner pressure of greater than or equal to 0.5 bar and less than or equal to 5.0 bar, preferably greater than or equal to 1.0 bar and less than or equal to 4.0 bar and more preferably greater than or equal to 2.0 bar and less than or equal to 3.5 bar, and may specifically satisfy an inner pressure of 3.0 bar.

In another embodiment, the cooling tower may have an inner temperature of 10° C. or higher, preferably 20° C. or higher and more preferably 40° C. or higher, and may be 200° C. or lower and preferably 150° C. or lower.

By the inner temperature and the inner pressure of the cooling tower satisfying the above-mentioned ranges in the step 1 as above, a content of acrylic acid included in the first low-boiling-point material discharged to an upper portion of the cooling tower may be minimized, that is, all acrylic acid in the reaction product of the bio-raw material is discharged to a lower portion of the cooling tower in the first high-boiling-point material including acrylic acid (AA), and as a result, yield and purity of the acrylic acid may increase.

In other words, in the process for producing acrylic acid, the step 1 may be a step of separating the first high-boiling-point material including acrylic acid and other low-boiling point by-products through cooling.

In the process for producing acrylic acid provided in one embodiment of the present application, a process of adding a first absorbent is included in the step of cooling a reaction product of the bio-raw material of the step 1.

Particularly, when conducting the compression process of the step 2 to describe later according to the present application, the condensed second high-boiling-point material may be recovered back to the step 1 to reduce loss of acrylic acid, and accordingly, the first absorbent used in the step 1 may not be used, or, even when used, the amount used may be effectively reduced.

In the process for producing acrylic acid provided in one embodiment of the present application, the first absorbent is included so that acrylic acid (AA) included in the first low-boiling-point material of the step 1 is included in 1 parts by weight or less with respect to 100 parts by weight of acrylic acid in the reaction product of the bio-raw material.

In the step 1 according to the present disclosure, acrylic acid in the reaction product of the bio-raw material may all be discharged to a lower portion of the cooling tower in the first high-boiling-point material including acrylic acid (AA) by adjusting the content of the first absorbent.

Specifically, in one embodiment of the present application, acrylic acid (AA) included in the first low-boiling-point material of the step 1 may be included in 1 parts by weight or less, preferably 0.5 parts by weight or less and more preferably 0.01 parts by weight or less, and may be 0 parts by weight or greater and preferably 0.005 parts by weight or greater with respect to 100 parts by weight of acrylic acid in the reaction product of the bio-raw material.

In other words, acrylic acid (AA) included in the first low-boiling-point material of the step 1 is an amount not obtained and discarded, and when including the first absorbent as above, the weight of acrylic acid (AA) included in the first low-boiling-point material is adjusted as above by adjusting the amount of the first absorbent, and an economically superior process for producing acrylic acid may be provided.

In the process for producing acrylic acid provided in one embodiment of the present application, when the cooling tower has a cooling temperature of higher than or equal to 10° C. and lower than or equal to 50° C., the first absorbent is included in greater than or equal to 1 parts by weight and less than or equal to 15 parts by weight with respect to 100 parts by weight of the reaction product of the bio-raw material of the step 1.

In another embodiment, the first absorbent may be included in greater than or equal to 0 parts by weight and less than or equal to 15 parts by weight, preferably greater than or equal to 0 parts by weight and less than or equal to 10 parts by weight, and more preferably greater than or equal to 0 parts by weight and less than or equal to 9 parts by weight with respect to 100 parts by weight of the reaction product of the bio-raw material of the step 1.

When conducting the compression process of the step 2 to describe later according to the present application, the condensed second high-boiling-point material may be recovered back to the step 1 to reduce loss of acrylic acid, and accordingly, the first absorbent used in the step 1 may not be used, or, even when used, the amount used may be effectively reduced, and when included in the above-mentioned range, the weight of acrylic acid (AA) included in the first low-boiling-point material is reduced to minimize discarded acrylic acid, and an economically superior process for producing acrylic acid may be provided.

The process for producing acrylic acid of the present application adjusts the amount of heat of the cooling tower when conducting the step 1 as above and includes the first absorbent in the above-mentioned content range, and, by particularly including the first absorbent in the above-mentioned range, adjusts the first high-boiling-point material including acrylic acid, water and the like to be all discharged to a lower portion of the absorption tower, and accordingly, finally produced acrylic acid has increased yield and purity, and acetaldehyde produced as a by-product may also be produced in high purity.

FIG. 1 is a schematic diagram of the process for producing acrylic acid according to the present application, and specifically, it is identified that the reaction product of the bio-raw material (2) is introduced to the cooling tower (A), and the boiling point-dependent separation process occurs by including the first absorbent (1), and it is identified herein that the first high-boiling-point material including acrylic acid (AA) (3) is separated to the lower portion and the first low-boiling-point material including acetaldehyde (ACHO) (4) is separated to the upper portion.

FIG. 1 is a schematic diagram of the process for producing acrylic acid according to one embodiment of the present application, and it is specifically identified that the reaction product of the bio-raw material (2) is introduced to the cooling tower (A) to separate the first low-boiling-point material (4) and the first high-boiling-point material (3) in the step 1, and it is seen that, by particularly conducting the compression process of the step 2 to describe later, the amount of the first absorbent (1) introduced may be effectively reduced, or the weight of acrylic acid included in the first low-boiling-point material (4) is adjusted to be low even when the first absorbent (1) itself is not included at all.

In the process for producing acrylic acid provided in one embodiment of the present application, the first absorbent includes a material having a boiling point difference of 20° C. or higher compared to a normal boiling point (NBP) of the acrylic acid (AA) and a boiling point difference of 50° C. or higher compared to a normal boiling point (NBP) of the acetaldehyde (ACHO).

In the present application, the normal boiling point (NBP) is a synonym for a boiling point, and may mean a boiling point of a liquid when an external pressure is 1 atmosphere (760 mmHg). A boiling point of a material normally means a normal boiling point, and for example, a normal boiling point of water may be expressed as 100° C. It means a temperature at which not only evaporation occurs from a liquid surface, but also vaporization occurs from inside a liquid and bubbles start to generate, and may mean a temperature at which a change occurs in a material state from a liquid to a gas.

In another embodiment, the first absorbent may be a material having a boiling point difference of higher than or equal to 20° C. and lower than or equal to 40° C. compared to a normal boiling point (NBP) of the acrylic acid (AA) and a boiling point difference of higher than or equal to 50° C. and lower than or equal to 80° C. compared to a normal boiling point (NBP) of the acetaldehyde (ACHO).

In one embodiment of the present application, the acrylic acid has a normal boiling point of 141° C., and the acetaldehyde has a normal boiling point of 20° C.

In one embodiment of the present application, the first absorbent may be a material having a boiling point difference of higher than or equal to 20° C. and lower than or equal to 40° C. compared to a normal boiling point (NBP) of the acrylic acid (AA), having a boiling point difference of higher than or equal to 50° C. and lower than or equal to 80° C. compared to a normal boiling point (NBP) of the acetaldehyde (ACHO), and having a higher boiling point compared to the acetaldehyde.

In one embodiment of the present application, the first absorbent may be used without limit as long as the above-mentioned conditions are satisfied, and specifically, the first absorbent may include water in one embodiment of the present application.

In one embodiment of the present application, the first absorbent may satisfy a temperature range of higher than or equal to 10° C. and lower than or equal to 60° C.

In another embodiment, the first absorbent may satisfy a temperature range of higher than or equal to 10° C. and lower than or equal to 60° C., preferably higher than or equal to 20° C. and lower than or equal to 50° C., and most preferably higher than or equal to 30° C. and lower than or equal to 50° C.

By the first absorbent temperature range satisfying the above-mentioned range as above, the first absorbent temperature is adjusted to a similar range as the range of the inner temperature of the cooling tower when included in the cooling tower of the step 1, which enhances economic feasibility by reducing inner capacity of the cooling tower.

In one embodiment of the present application, the acrylic acid included in the first high-boiling-point material may be included in 95 parts by weight or greater based on 100 parts by weight of acrylic acid included in the reaction product of the bio-raw material.

In another embodiment, the acrylic acid included in the first high-boiling-point material may be included in 95 parts by weight or greater, preferably 97 parts by weight or greater and more preferably 99 parts by weight or greater, and may be 100 parts by weight or less based on 100 parts by weight of acrylic acid included in the reaction product of the bio-raw material.

In one embodiment of the present application, the acetaldehyde included in the first low-boiling-point material may be included in 90 parts by weight or greater based on 100 parts by weight of acetaldehyde included in the reaction product of the bio-raw material.

In another embodiment, the acetaldehyde included in the first low-boiling-point material may be included in 90 parts by weight or greater, preferably 93 parts by weight or greater and more preferably 95 parts by weight or greater, and may be 100 parts by weight or less and preferably 99 parts by weight or less based on 100 parts by weight of acetaldehyde included in the reaction product of the bio-raw material.

In other words, the step 1 corresponds to a process of separating acetaldehyde and acrylic acid, and the present disclosure has a high recovery rate of acrylic acid separated according to the step 1 by conducting the compression process and recovering acrylic acid that may be included in a small amount in the first low-boiling-point material in the step 2 to describe later.

One embodiment of the present application provides a step 2-1 of separating a second-1 low-boiling-point material including acetaldehyde (ACHO) and a second-1 high-boiling-point material including acrylic acid (AA) by distilling the first high-boiling-point material including acrylic acid (AA).

In one embodiment of the present application, the step 2-1 is a step of once more distilling the first high-boiling-point material including acrylic acid (AA) discharged to a lower portion of the cooling tower in the step 1, and corresponds to a step of separating a second-1 low-boiling-point material including acetaldehyde (ACHO) and a second-1 high-boiling-point material including acrylic acid (AA).

In other words, through such a process of the step 2-1, acetaldehyde that may be discharged to a lower portion of the cooling tower in the step 1 may be further separated to obtain high yield and high purity acrylic acid, and by obtaining a second-1 low-boiling-point material including acetaldehyde (ACHO), high yield and high purity acetaldehyde may also be obtained through a separation process of the step to describe later.

In one embodiment of the present application, the first high-boiling-point material including acrylic acid (AA) may include water; acrylic acid; and acetaldehyde.

In one embodiment of the present application, acrylic acid included in the second-1 high-boiling-point material may be included in 95 parts by weight or greater based on 100 parts by weight of the acrylic acid included in the first high-boiling-point material including acrylic acid (AA).

In another embodiment, acrylic acid included in the second-1 high-boiling-point material may be included in 95 parts by weight or greater, preferably 97 parts by weight or greater and more preferably 99 parts by weight or greater, and may be 100 parts by weight or less and preferably 99.99 parts by weight or less based on the 100 parts by weight of the acrylic acid included in the first high-boiling-point material including acrylic acid (AA).

In the process for producing acrylic acid according to the present disclosure, the yield of finally produced acrylic acid included in the second-1 high-boiling-point material may be high by going through the process of adding the absorbent and cooling in the step 1 and separating aldehyde once again in the step 2-1.

In one embodiment of the present application, the second-1 high-boiling-point material may be purified to obtain final acrylic acid.

In one embodiment of the present application, the acetaldehyde included in the second-1 low-boiling-point material may be included in 95 parts by weight or greater based on 100 parts by weight of the acetaldehyde included in the first high-boiling-point material including acrylic acid (AA).

In another embodiment, the acetaldehyde included in the second-1 low-boiling-point material may be included in 95 parts by weight or greater, preferably 96 parts by weight or greater and more preferably 97 parts by weight or greater, and may be 100 parts by weight or less and preferably 99.99 parts by weight or less based on 100 parts by weight of the acetaldehyde included in the first high-boiling-point material including acrylic acid (AA).

As described above, while obtaining acrylic acid in a high yield, acetaldehyde may be also commercialized by separating the acetaldehyde included in the first high-boiling-point material including acrylic acid (AA) again and going through a process to describe later.

FIG. 2 is a schematic diagram of the process for producing acrylic acid according to the present application, and it may be identified that the step 2-1 specifically separates the first high-boiling-point material including acrylic acid (AA) (3) through a distillation tower (E) to obtain the second-1 high-boiling-point material including acrylic acid (AA) (12), and supplies the second-1 low-boiling-point material including acetaldehyde (ACHO) (13) to a process to describe later.

Herein, in the step 4 to describe later, the first high-boiling-point material including acrylic acid (AA) or the second-1 high-boiling-point material including acrylic acid (AA) (12) may be purified to obtain final acrylic acid.

One embodiment of the present application provides the step 2 of separating a condensed second low-boiling-point material including acetaldehyde (ACHO) and a second high-boiling-point material including acrylic acid (AA) by compressing the first low-boiling-point material including acetaldehyde (ACHO).

In one embodiment of the present application, the step 2 is a step of compressing and condensing the first low-boiling-point material including acetaldehyde (ACHO) discharged to an upper portion of the cooling tower in the step 1, and through the condensing step, a second low-boiling-point material including acetaldehyde (ACHO) and a second high-boiling-point material including acrylic acid (AA) may be separated, and by particularly including the process of condensing the second low-boiling-point material including acetaldehyde (ACHO), a pressure of the process of the step 3 to describe later may be increased during the operation, and an amount of a refrigerant used to cool the second absorbent may be minimized.

In other words, through such a process of the step 2, acrylic acid that may be discharged to an upper portion of the cooling tower in the step 1 may be further separated to be included the second high-boiling-point material, and is included again in the step 1 through liquid circulation to obtain high yield and high purity acrylic acid, and by condensing the second low-boiling-point material including acetaldehyde (ACHO), high yield and high purity acetaldehyde may be obtained through a separation process of the step 3 to describe later.

In the process for producing acrylic acid provided in one embodiment of the present application, the step 2 includes a step of compressing and condensing through a compressor, and the compressor has a discharge pressure of greater than or equal to 1.2 bar and less than or equal to 10.0 bar.

In another embodiment, the compressor may have a discharge pressure of greater than or equal to 1.5 bar and less than or equal to 10.0 bar, preferably greater than or equal to 2.5 bar and less than or equal to 7.0 bar, and more preferably greater than or equal to 3.0 bar and less than or equal to 5.0 bar.

In the process for producing acrylic acid provided in one embodiment of the present application, the compression ratio in the step 2 is 1.0 or greater.

In the process for producing acrylic acid provided in another embodiment, the compression ratio in the step 2 may be 1.0 or greater and preferably 1.2 or greater, and may be 2.5 or less and preferably 2.0 or less.

The compression ratio means a compressor compression ratio, and may mean a pressure discharged after introduced to the compressor of the step 2 (outlet pressure)/a pressure before introduced to the compressor (inlet pressure).

By the compressor having a discharge pressure in the above-mentioned range in the step 2, acrylic acid and acetaldehyde that may be included together in an upper portion of the cooling tower of the step 1 may be effectively separated, and by particularly condensing the second low-boiling-point material including acetaldehyde (ACHO) to a proper range, excellent economic feasibility may be obtained by minimizing the amount of a refrigerant used for cooling the second absorbent in the process.

In the process for producing acrylic acid provided in one embodiment of the present application, a step of circulating the second high-boiling-point material including acrylic acid (AA) in the step 2 to the step 1 is further included.

The process for producing acrylic acid according to the present application has a circulation flow of separating the acrylic acid that may be discharged to the upper portion in the step 1 to the second high-boiling-point material including acrylic acid (AA) again through the step 2, and including the second high-boiling-point material including acrylic acid (AA) again in the step 1, and excellent economic feasibility may be obtained by minimizing the loss of acrylic acid that may be included in the bio-raw material.

In other words, the second high-boiling-point material including acrylic acid (AA) in the step 2 is introduced to an upper portion of the cooling tower of the step 1, and herein, the reaction product of the bio-raw material included in the step 1 is introduced to a lower portion of the cooling tower for re-separation.

In one embodiment of the present application, the process of the step 2 may be conducted as a single-step compression and condensation process, and in addition, may be conducted as a multi-step compression process.

In other words, the process for producing acrylic acid according to the disclosure of the present application has a step of compressing and condensing of the step 2 as above, and through such a process, high purity and high yield acrylic acid and acetaldehyde may each be commercialized, and an economically superior process may also be provided by minimizing the amount of a refrigerant used.

FIG. 1 and FIG. 2 are schematic diagrams for the process for producing acrylic acid according to one embodiment of the present application, and the step 2 may be specifically identified. Specifically, it is identified that the first low-boiling-point material including acetaldehyde (ACHO) (4) discharged from an upper portion of the cooling tower (A) is supplied to the compressor (B) to separate the condensed second low-boiling-point material including acetaldehyde (ACHO) (6) and the second high-boiling-point material including acrylic acid (AA) (5), and it is identified that, by particularly supplying the separated second high-boiling-point material including acrylic acid (AA) (5) to the cooling tower (A) again, loss of acrylic acid that may be discharged to an upper portion of the cooling tower (A) is minimized.

One embodiment of the present application provides the step 3 of separating a first incompressible material and a third low-boiling-point material including acetaldehyde (ACHO) by adding a second absorbent to the second low-boiling-point material including acetaldehyde (ACHO) and cooling the result.

In the process for producing acrylic acid of the present application, the step 3 is a process of adding a second absorbent to the second low-boiling-point material discharged to an upper portion of the cooling tower in the step 1 and cooling the result, and through such a process, acetaldehyde produced as a by-product in the process for producing acrylic acid may also be commercialized. In other words, it is a step of commercializing high purity acetaldehyde as well while obtaining high purity acrylic acid, which is considered as a characteristic of the disclosure of the present application, and may be a main characteristic of the present disclosure.

In the process for producing acrylic acid provided in one embodiment of the present application, the step 3 includes a step of separating through an absorption tower, and the absorption tower has a temperature of is higher than or equal to 0° C. and lower than or equal to 150° C. and an inner pressure of greater than or equal to 0.5 bar and less than or equal to 10.0 bar.

In another embodiment, the absorption tower of the step 3 may have an inner pressure of greater than or equal to 0.5 bar and less than or equal to 10.0 bar, preferably greater than or equal to 1.0 bar and less than or equal to 8.0 bar and more preferably greater than or equal to 1.5 bar and less than or equal to 5.0 bar, and may specifically satisfy an inner pressure of 3.0 bar.

In another embodiment, the absorption tower of the step 3 may have an inner temperature of 0° C. or higher, preferably 5° C. or higher and more preferably 10° C. or higher, and may be 150° C. or lower and preferably 100° C. or lower.

By the inner temperature and the inner pressure of the absorption tower satisfying the above-mentioned ranges in the step 3 as above, the acetaldehyde included in the second low-boiling-point material discharged to an upper portion of the absorption tower may be commercialized in high yield and high purity, and by the process of separating from the first incompressible material included in the second low-boiling-point material progressing smoothly in particular, acetaldehyde may be obtained in high yield and high purity while obtaining acrylic acid.

In the process for producing acrylic acid provided in one embodiment of the present application, the second absorbent is included so that acetaldehyde (ACHO) included in the first incompressible material of the step 3 is included in 1 parts by weight or less with respect to 100 parts by weight of acetaldehyde in the reaction product of the bio-raw material.

In the step 3 according to the present disclosure, acetaldehyde in the reaction product of the bio-raw material may all be discharged to a lower portion of the absorption tower in the second low-boiling-point material including acetaldehyde (ACHO) by adjusting the content of the second absorbent.

Specifically, in one embodiment of the present application, acetaldehyde (ACHO) included in the first incompressible material of the step 3 may be included in 5 parts by weight or less, preferably 1.5 parts by weight or less and more preferably 1.0 parts by weight or less, and may be 0 parts by weight or greater and preferably 0.01 parts by weight or greater with respect to 100 parts by weight of acetaldehyde in the reaction product of the bio-raw material.

In other words, another characteristic of the process for producing acrylic acid according to the present application is commercializing acetaldehyde produced as a by-product, and by adjusting the amount of the second absorbent as above, loss of the acetaldehyde may be minimized.

The process for producing acrylic acid of the present application includes the second absorbent in the above-mentioned content range when conducting the step 3 as above, and, by particularly including the second absorbent in the above-mentioned range, adjusts only the third low-boiling-point material including acetaldehyde to be discharged to a lower portion of the absorption tower of the step 3 in the second low-boiling-point material including acetaldehyde, an incompressible material and the like, and finally produced acetaldehyde has increased yield and purity.

In the process for producing acrylic acid provided in one embodiment of the present application, the second absorbent includes, as a material having a higher boiling point compared to a normal boiling point (NBP) of the acetaldehyde (ACHO), a material having a boiling point difference of 20° C. or higher.

In the process for producing acrylic acid provided in another embodiment, the second absorbent includes, as a material having a higher boiling point compared to a normal boiling point (NBP) of the acetaldehyde (ACHO), a material having a boiling point difference of higher than or equal to 20° C. and lower than or equal to 100° C.

In the process for producing acrylic acid provided in another embodiment, the second absorbent includes, as a material having a higher boiling point compared to a normal boiling point (NBP) of the acetaldehyde (ACHO), a material having a boiling point difference of higher than or equal to 20° C. and lower than or equal to 100° C., preferably having a boiling point difference of higher than or equal to 30° C. and lower than or equal to 90° C., and more preferably having a boiling point difference of higher than or equal to 50° C. and lower than or equal to 80° C.

In another embodiment, the second absorbent may be a material having a higher boiling point compared to a boiling point of the acetaldehyde.

In one embodiment of the present application, the second absorbent may include one or more selected from the group consisting of water and acrylic acid.

In one embodiment of the present application, the second absorbent may satisfy a temperature range of higher than or equal to −5° C. and lower than or equal to 20° C.

In another embodiment, the second absorbent may satisfy a temperature range of higher than or equal to −5° C. and lower than or equal to 20° C., preferably higher than or equal to 5° C. and lower than or equal to 15° C., and most preferably higher than or equal to 5° C. and lower than or equal to 10° C.

By the second absorbent temperature range satisfying the above-mentioned range as above, the second absorbent temperature is adjusted to a similar range as the range of the inner temperature of the absorption tower when included in the absorption tower of the step 3, which enhances economic feasibility by reducing inner capacity of the absorption tower.

In addition, in the process for producing acrylic acid according to the present application, the pressure of the absorption tower of the step 3 used for separating acetaldehyde may be increased by adding the compression process in the step 2 described above, which is advantageous for acetaldehyde condensation, and the amount of the second absorbent used may be reduced, and by reducing the amount of the second absorbent used, a cooling calorie for cooling the second absorbent is reduced, and the amount of a refrigerant used may be reduced.

In one embodiment of the present application, the acetaldehyde included in the third low-boiling-point material may be included in 95 parts by weight or greater based on 100 parts by weight of the acetaldehyde included in the second low-boiling-point material.

In another embodiment, the acetaldehyde included in the third low-boiling-point material may be included in 95 parts by weight or greater, preferably 97 parts by weight or greater and more preferably 99 parts by weight or greater, and may be 100 parts by weight or less and preferably 99.9 parts by weight or less based on 100 parts by weight of the acetaldehyde included in the second low-boiling-point material.

In one embodiment of the present application, the first incompressible material may include carbon monoxide, carbon dioxide and an inert gas.

The step 3 of the present application may be identified in FIG. 1 and FIG. 2, and specifically, the process of supplying the second low-boiling-point material (6) to the absorption tower (C), and then supplying the second absorbent (8) to separate the first incompressible material (9) including an inert gas and the third low-boiling-point material (10) may be identified.

In the process for producing acrylic acid provided in one embodiment of the present application, a step of separating the third low-boiling-point material including acetaldehyde (ACHO) to separate acetaldehyde and the second absorbent is further included.

The process corresponds to a process for obtaining acetaldehyde when the process of the step 2-1 described above is not conducted.

In the process for producing acrylic acid provided in another embodiment, a step of separating the second low-boiling-point material including acetaldehyde (ACHO) and the third low-boiling-point material including acetaldehyde (ACHO) to separate acetaldehyde and the second absorbent is further included.

The process corresponds to a process for obtaining acetaldehyde when the process of the step 2-1 described above is conducted.

In the process for producing acrylic acid provided in one embodiment of the present application, the step includes a step of separating through a separation tower, and the separation tower has a temperature of higher than or equal to 10° C. and lower than or equal to 200° C. and an inner pressure of greater than or equal to 0.3 bar and less than or equal to 10.0 bar.

In one embodiment of the present application the step may be expressed as step 3-1.

In other words, the process of the step 3-1 corresponds to a process of separating the second absorbent and obtaining pure acetaldehyde for aldehyde commercialization.

In another embodiment, the separation tower of the step 3-1 has an inner pressure of greater than or equal to 0.3 bar and less than or equal to 10.0 bar, preferably greater than or equal to 1.0 bar and less than or equal to 8.0 bar and more preferably greater than or equal to 2.0 bar and less than or equal to 5.0 bar, and may specifically satisfy an inner pressure of 3.0 bar.

In another embodiment, the separation tower of the step has an inner temperature of 10° C. or higher, preferably 20° C. or higher and more preferably 40° C. or higher, and may be 200° C. or lower and preferably 150° C. or lower.

By the inner temperature and the inner pressure of the separation tower satisfying the above-mentioned ranges as above, the acetaldehyde included in the third low-boiling-point material discharged to a lower portion of the absorption tower of the step 3 may be commercialized in high yield and high purity, and by the process of separating from the second absorbent included in the third low-boiling-point material progressing smoothly in particular, acetaldehyde may be obtained in high yield and high purity while obtaining acrylic acid.

In addition, after separating acetaldehyde and the second absorbent as above, the second absorbent may be included again in the step 3 through a liquid flow, and the amount of the second absorbent used may also be minimized, and through such a process of the step 2, the process for producing acrylic acid according to the present disclosure is capable of reducing the amount of a refrigerant used for cooling the separated second absorbent.

In one embodiment of the present application, a step of cooling the second absorbent using a refrigerant may be further included after separating acetaldehyde and the second absorbent.

In other words, in the process for producing acrylic acid provided in one embodiment of the present application, the second absorbent included in the step 3 may include the second absorbent supplied from the outside and the second absorbent reused through the liquid flow as above, and by including the step of cooling with a refrigerant, the second absorbent has a temperature of higher than or equal to −5° C. and lower than or equal to 20° C.

By the second absorbent temperature satisfying the above-mentioned range as above, an adjustment may be made to absorb 99 wt % or greater of the acetaldehyde in the second low-boiling-point material including acetaldehyde (ACHO).

In the process for producing acrylic acid provided in one embodiment of the present application, purity of the acetaldehyde is 95% or greater, and the recovery rate based on the reaction product of the bio-raw material is 95% or greater.

In another embodiment, purity of the acetaldehyde may be 100% or less, and 99.99% or less.

In other words, the process for producing acrylic acid according to the disclosure of the present application is capable of producing final acrylic acid in high purity and high yield by including the step 1 of separating a first low-boiling-point material including acetaldehyde (ACHO) and a first high-boiling-point material including acrylic acid (AA) by adding (or not adding) a first absorbent to a reaction product of a bio-raw material and cooling the result and the step 2 of compressing, and in addition thereto, is capable of commercializing acetaldehyde, which is produced as a by-product, as a high purity and high yield product as well by including the step 3 and the separation process through the separation tower in the process, and as a result, acrylic acid and acetaldehyde may all be obtained, which enhances economic feasibility of the bioprocess.

The production process of the present disclosure is particularly useful for synthesizing acrylic acid, and specifically, the vapor composition including lactic acid obtained in the present disclosure may be brought into contact with a dehydration catalyst to prepare acrylic acid. A produced reaction gas is collected and liquefied by cooling or brining into contact with a collection liquid, and after going through a purification process such as extraction, distillation and crystallization, high purity acrylic acid may be obtained. Produced acrylic acid is widely used as a raw material of absorbent polymers, paints, adhesives or the like.

Hereinafter, examples of the present disclosure will be described in detail so that those having common knowledge in the art may readily implement the present disclosure. However, the present disclosure may be embodied in various different forms, and is not limited to the examples described herein.

Preparation Example

The following examples and comparative examples were simulated by Aspen Plus of Aspen Technology Inc.

Example 1

An operation process of Example 1 may be identified in FIG. 2, and as illustrated in FIG. 2, a flow rate included in each step and a weight ratio (wt %) of main components (water, acrylic acid and acetaldehyde) that may be included in the flow rate are as shown in the following Table 1 to Table 5.

TABLE 1

| Step 1 | | 1 | 2 | 3 | 4 |
|---|---|---|---|---|---|
| Flow Rate (kg/hr) | | 0 | 14881 | 13090 | 9270 |
| Temperature (° C.) | | 0 | 150 | 125.3 | 49.2 to 86.9 |
| Composition | Water | — | 50.4 | 57.3 | 1.4 |
| (wt %) | Acrylic Acid | — | 33.6 | 38.24 | 0.02 |
| | Acetaldehyde | — | 6.7 | 0.9 | 88.8 |

In the step 1, the cooling tower was operated at a cooling temperature of approximately 50° C. to 1250° C. and an inner pressure of 3.0 bar.

In the stream No. 4 of Table 1, the acetaldehyde means the flow rate including the recovery process of acetic acid (step 2) after conducting one cycle of the whole process.

After going through the step 1, the compression process of the step 2 was conducted on the stream No. 4 (first low-boiling-point material), and the compression ratio was 1.7. The temperature of the first low-boiling-point material introduced to the compressor in the stream No. 4 was 49.2° C., and the temperature increased to 86.9° C. after being included in the compressor. After that, the temperature of the first low-boiling-point material (stream No. 6) to describe later after going through the compressor was 40.0° C., and after that, the second high-boiling-point material (5) was circulated back to the step 1.

TABLE 2

| Step 2 | | 4 | 5 | 6 |
|---|---|---|---|---|
| Flow Rate (kg/hr) | | 9270 | 7480 | 1790 |
| Temperature (° C.) | | 49.2 to 86.9 | 40 | 40 |
| Composition | Water | 1.4 | 1.6 | 0.3 |
| (wt %) | Acrylic Acid | 0.02 | 0.03 | — |
| | Acetaldehyde | 88.8 | 98.3 | 49.2 |

TABLE 3

| Step 2-1 | | 3 | 12 | 13 |
|---|---|---|---|---|
| Flow Rate (kg/hr) | | 13090 | 12920 | 170 |
| Temperature (° C.) | | 125.3 | 128.2 | 39.2 |
| Composition | Water | 57.3 | 57.7 | 23.7 |
| (wt %) | Acrylic Acid | 38.2 | 38.7 | 1.9 |
| | Acetaldehyde | 0.9 | — | 72.6 |

In the step 2-1, the distillation tower was operated at a temperature of approximately 40° C. to 130° C. and an inner pressure of 2.5 bar.

TABLE 4

| Step 3 | | 6 | 8 | 9 | 10 |
|---|---|---|---|---|---|
| Flow Rate (kg/hr) | | 1790 | 3385 | 909 | 4266 |
| Temperature (° C.) | | 40 | 5 | 13.9 | 54.5 |
| Composition | Water | 0.3 | 96.2 | 0.2 | 76.4 |
| (wt %) | Acrylic Acid | — | 2.6 | — | 2.0 |
| | Acetaldehyde | 49.2 | — | 0.9 | 20.4 |

In the step 3, the absorption tower was operated at a temperature of approximately 14° C. to 55° C. and an inner pressure of 4.5 bar. In addition, the second absorbent included in the step 3 had a normal boiling point of 100° C.

TABLE 5

| Step 3-1 | | 10 | 13 | 11 | 8 |
|---|---|---|---|---|---|
| Flow Rate (kg/hr) | | 4266 | 170 | 1023 | 3385 |
| Temperature (° C.) | | 54.5 | 39.2 | 5 | 5 |
| Composition | Water | 76.4 | 23.7 | 3.5 | 96.2 |
| (wt %) | Acrylic Acid | 2.0 | 1.9 | 0.04 | 2.6 |
| | Acetaldehyde | 20.4 | 72.6 | 96.4 | — |

In the step 3-1, the separation tower was operated at a temperature of approximately 40° C. to 133° C. and an inner pressure of 3.0 bar. Particularly, in Table 5, the amount of the refrigerant used for cooling the second absorbent was identified to be 0.12 Gcal/hr.

Example 2

An operation process of Example 2 may be identified in FIG. 2, and as illustrated in FIG. 2, a flow rate included in each step and a weight ratio (wt %) of main components (water, acrylic acid and acetaldehyde) that may be included in the flow rate are as shown in the following Table 6 to Table 10.

Particularly, unlike Example 1, Example 2 corresponds to the process using the first absorbent in the step 1.

TABLE 6

| Step 1 | | 1 | 2 | 3 | 4 |
|---|---|---|---|---|---|
| Flow Rate (kg/hr) | | 1000 | 11787.9 | 10285.9 | 3090.3 |
| Temperature (° C.) | | 40 | 150 | 121.1 | 88.1 to 117.7 |
| Composition | Water | 1000 kg/hr | 53.8 | 71.1 | 16.9 |
| (wt %) | | (100 wt %) | | | |
| | Acrylic Acid | — | 24.1 | 27.7 | 0.01 |
| | Acetaldehyde | — | 7.3 | 0.2 | 30.1 |

In the step 1, the cooling tower was operated at a cooling temperature of approximately 88° C. to 121° C. and an inner pressure of 2.5 bar. In addition, the first absorbent included in the step 1 had a normal boiling point of 100° C.

In the stream No. 4 of Table 6, the acetaldehyde means the flow rate including the recovery process of acetic acid (step 2) after conducting one cycle of the whole process.

After going through the step 1, the compression process of the step 2 was conducted on the stream No. 4 (first low-boiling-point material), and the compression ratio was 1.3. The temperature of the first low-boiling-point material introduced to the compressor in the stream No. 4 was 88.1° C., and the temperature increased to 117.7° C. after being included in the compressor. After that, the temperature of the first low-boiling-point material (stream No. 6) to describe later after going through the compressor was 40.0° C., and after that, the second high-boiling-point material (5) was circulated back to the step 1.

TABLE 7

| | Step 2 | 4 | 5 | 6 |
|---|---|---|---|---|
| | Flow Rate (kg/hr) | 3090.3 | 588.4 | 2502 |
| | Temperature (° C.) | 88.1 to 117.7 | 40 | 40 |
| Composition | Water | 16.9 | 83.5 | 1.3 |
| (wt %) | Acrylic Acid | 0.01 | 0.03 | — |
| | Acetaldehyde | 30.1 | 16.4 | 33.3 |

TABLE 8

| | Step 2-1 | 3 | 12 | 13 |
|---|---|---|---|---|
| | Flow Rate (kg/hr) | 10285.9 | 10185.9 | 98.2 |
| | Temperature (° C.) | 121.1 | 120.7 | 54.3 |
| Composition | Water | 71.1 | 71.1 | 69.7 |
| (wt %) | Acrylic Acid | 27.6 | 27.9 | 6.6 |
| | Acetaldehyde | 0.2 | — | 22.5 |

In the step 2-1, the distillation tower was operated at a temperature of approximately 55° C. to 121° C. and an inner pressure of 2.5 bar.

TABLE 9

| | Step 3 | 6 | 8 | 9 | 10 |
|---|---|---|---|---|---|
| | Flow Rate (kg/hr) | 2502 | 5250 | 1645.3 | 6106.6 |
| | Temperature (° C.) | 40 | 5 | 8.5 | 42.9 |
| Composition | Water | 1.3 | 96.1 | 0.2 | 83.1 |
| (wt %) | Acrylic Acid | — | 3.5 | 0.01 | 3.0 |
| | Acetaldehyde | 33.3 | — | 0.3 | 13.5 |

In the step 3, the absorption tower was operated at a temperature of approximately 9° C. to 43° C. and an inner pressure of 3.0 bar. In addition, the second absorbent included in the step 3 had a normal boiling point of 100° C.

TABLE 10

| | Step 3-1 | 10 | 13 | 11 | 8 |
|---|---|---|---|---|---|
| | Flow Rate (kg/hr) | 6106.6 | 98.2 | 885.4 | 5250 |
| | Temperature (° C.) | 42.9 | 54.3 | 40 | 5 |
| Composition | Water | 83.1 | 69.7 | 4.7 | 96.1 |
| (wt %) | Acrylic Acid | 3.0 | 6.6 | 0.1 | 3.5 |
| | Acetaldehyde | 13.5 | 22.5 | 95.2 | — |

In the step 3-1, the separation tower was operated at a temperature of approximately 40° C. to 133° C. and an inner pressure of 3.0 bar. Particularly, in Table 10, the amount of the refrigerant used for cooling the second absorbent was identified to be 0.18 Gcal/hr.

Comparative Example 1

A process was conducted in the same manner as in Example 1 except that the step 2 was not included. Specifically, a process as in FIG. 3 was conducted, and it was identified that the flow rate of the first absorbent was included to be high with the first absorbent amount being 6000 kg/hr by not including the compression process (step 2), and the amount of the refrigerant used was 0.39 Gcal/hr to commercialize the same amount of acetaldehyde, which corresponds to an increase of 69.2% in the amount of the refrigerant used compared to Example 1.

Comparative Example 2

A process was conducted in the same manner as in Example 2 except that the step 2 was not included. Specifically, a process as in FIG. 3 was conducted, and it was identified that the amount of the refrigerant used was 0.39 Gcal/hr to commercialize the same amount of acetaldehyde, which corresponds to an increase of 53.8% in the amount of the refrigerant used compared to Example 2.

As seen from Example 1, Example 2, Comparative Example 1 and Comparative Example 2, the process for producing acrylic acid according to one embodiment of the present application includes the step 1 of separating a first low-boiling-point material including acetaldehyde (ACHO) and a first high-boiling-point material including acrylic acid (AA) by adding (or not adding) a first absorbent to a reaction product of a bio-raw material and cooling the result and the step 2 of compressing and condensing the first low-boiling-point material including acetaldehyde (ACHO) gone through the step 1 by including the first low-boiling-point material including acetaldehyde (ACHO) in a compressor, and accordingly, it was identified that the pressure of the absorption process (step 3) used to separate acetaldehyde was increased during the operation, and since increasing the pressure was advantageous for condensing the aldehyde, the amount of the second absorbent used was effectively reduced, and as a result, the cooling calorie of the absorbent was reduced and the amount of the refrigerant used was reduced.

Particularly, acetaldehyde is produced as a by-product in the reaction product of the bio-raw material since a dehydration reaction of lactic acid occurs at a high temperature (330° C. to 400° C.), and by the process for producing acrylic acid according to the disclosure of the present application including the step 3 in the process (second absorbent), acetaldehyde produced as a by-product may also be commercialized as a high purity and high yield product while producing high purity and high yield acrylic acid as above, and it was identified that economic feasibility of the bioprocess was enhanced since both acrylic acid and acetaldehyde were obtained.

As seen from Comparative Example 1 and Comparative Example 2, which correspond to cases of not conducting the step 2 (compression process) according to the present application, it was identified that the flow rate of the first absorbent was included to be high in the step 1, and loss of acrylic acid included in the first low-boiling-point material discharged to an upper portion in the step 1 was not able to be prevented by not conducting the compression process, and furthermore, the amount of the refrigerant used increased since the cooling calorie for cooling the second absorbent was required.

The invention claimed is:

1. A process for producing acrylic acid, the process comprising:
   (1) separating a first low-boiling-point material including acetaldehyde (ACHO) and a first high-boiling-point material including acrylic acid (AA) by cooling a reaction product of a bio-raw material;
   (2) separating a condensed second low-boiling-point material including acetaldehyde (ACHO) and a second high-boiling-point material including acrylic acid (AA) by compressing the first low-boiling-point material including acetaldehyde (ACHO);
   (3) separating a first incompressible material and a third low-boiling-point material including acetaldehyde (ACHO) by adding a second absorbent to the condensed second low-boiling-point material including acetaldehyde (ACHO) and cooling thereof; and
   (4) purifying the first high-boiling-point material including acrylic acid (AA) to obtain acrylic acid.

2. The process for producing acrylic acid of claim 1, further comprising a process of adding a first absorbent during cooling the reaction product of the bio-raw material of the step (1).

3. The process for producing acrylic acid of claim 2, wherein the first absorbent comprises a material having a boiling point difference of 20° C. or higher compared to a normal boiling point (NBP) of the acrylic acid (AA) and a boiling point difference of 50° C. or higher compared to a normal boiling point (NBP) of the acetaldehyde (ACHO).

4. The process for producing acrylic acid of claim 1, wherein the second absorbent comprises a material having a boiling point which is 20° C. or higher than a normal boiling point (NBP) of the acetaldehyde (ACHO).

5. The process for producing acrylic acid of claim 1, wherein the step (1) is performed by using a cooling tower; and
   wherein the cooling tower has a cooling temperature of higher than or equal to 10° C. and lower than or equal to 150° C. and an inner pressure of greater than or equal to 0.5 bar and less than or equal to 5.0 bar.

6. The process for producing acrylic acid of claim 2, wherein the first absorbent is included in an amount to make the acrylic acid (AA) included in the first low-boiling-point material of the step (1) to be 1 parts by weight or less with respect to 100 parts by weight of acrylic acid included in the reaction product of the bio-raw material.

7. The process for producing acrylic acid of claim 1, wherein the step (3) is performed by using an absorption tower; and
   wherein the absorption tower has a temperature of higher than or equal to 0° C. and lower than or equal to 150° C. and an inner pressure of greater than or equal to 0.5 bar and less than or equal to 10.0 bar.

8. The process for producing acrylic acid of claim 1, wherein the second absorbent is included in an amount to make the acetaldehyde (ACHO) included in the first incompressible material of the step (3) to be 1 parts by weight or less with respect to 100 parts by weight of acetaldehyde included in the reaction product of the bio-raw material.

9. The process for producing acrylic acid of claim 1, further comprising a step of circulating the second high-boiling-point material including acrylic acid (AA) of the step (2) to the step (1).

10. The process for producing acrylic acid of claim 1, wherein the step (2) is performed by using a compressor; and
    wherein the compressor has a discharge pressure of greater than or equal to 1.2 bar and less than or equal to 10.0 bar.

11. The process for producing acrylic acid of claim 1, further comprising a step of separating the third low-boiling-point material including acetaldehyde (ACHO) into acetaldehyde and the second absorbent.

12. The process for producing acrylic acid of claim 11, wherein the step of separating the third low-boiling-point material is performed by using a separation tower; and
    wherein the separation tower has a temperature of higher than or equal to 10° C. and lower than or equal to 200° C. and an inner pressure of greater than or equal to 0.3 bar and less than or equal to 10.0 bar.

13. The process for producing acrylic acid of claim 1, wherein the second absorbent has a temperature of higher than or equal to −5° C. and lower than or equal to 20° C.

14. The process for producing acrylic acid of claim 11, wherein purity of the acetaldehyde is 95% or greater, and a recovery rate thereof based on the reaction product of the bio-raw material is 95% or greater.

* * * * *